Patented Feb. 25, 1941

2,232,723

UNITED STATES PATENT OFFICE 2,232,723

TITANIUM PIGMENTS CONTAINING WATER SOLUBLE SALTS OF ORGANIC ACIDS

Gordon Derby Patterson, Wilmington, Del., assignor to E. I. du Pont de Nemours & Company, Wilmington, Del., a corporation of Delaware No Drawing. Application June 10, 1937, Serial No. 147,485

15 Claims. (Cl. 134—58)

The present invention relates to a process for the production of improved titanium pigments. More particularly it relates to the treatment of titanium pigments with water soluble salts. Still more particularly it relates to titanium pigments associated with metal salts of water soluble organic acids whereby paint compositions into which said titanium pigments have been incorporated have improved weather resistance.

Titanium oxide is an inert pigment and does not contribute to film reinforcement through neutralization of acidity and soap formation. Therefore, the extent to which titanium oxide pigments are used in linseed oil outside paint is limited due to the tendency of such paints to chalk and erode excessively. When titanium oxide pigments are used in such paints it is necessary to limit the amount of titanium pigments and to supplement the titanium oxide pigment with a so-called reactive pigment such as zinc oxide. Zinc oxide, an acid accepting type of pigment, reacts with film acids or with film decomposition products, forming zinc soap which tend to strengthen and harden the film. However, if the amount of reactive pigment is too great, the film becomes too hard and brittle, eventually resulting in failure due to checking and cracking.

Other basic materials can be used which give results similar to those already outlined but many basic materials, particularly those which are very active bases, must be limited in amount and used with caution because of their tendency to cause thickening and gelling of the paint vehicle. In some cases it is impossible to add a sufficient quantity of the basic material to give the necessary chalking resistance without inducing objectionable bodying of the paint during preparation and storage. In some such cases such basic materials can be used if the paint is applied immediately after preparation but from the commercial standpoint this is impractical. Even zinc oxide often causes objectionable thickening, particularly if the vehicles are acid in character.

Another defect of the prior art pigments as described above is that coating compositions, into which such pigments have been incorporated, are very poor in color stability, having a marked tendency to yellow excessively on exposure to light. This is a serious handicap and one which has not been overcome with any great degree of success.

It is an object of the present invention to produce treated titanium oxide pigments which will not cause thickening and gelling of the vehicle during preparation of the paint or on storage. A further object is to produce a titanium oxide pigment which will impart to paint films improved resistance to chalking and weathering. A still further object is to produce a treated titanium oxide pigment which will impart to paint films color stability. A still further object is the production of coating compositions having such treated titanium oxide pigments incorporated therein. Still further objects will become apparent from an examination of the herein described invention. These objects are attained by treating a titanium oxide pigment with a water soluble salt.

Broadly the present invention comprises treating a titanium oxide pigment with up to 35% of a water soluble salt.

In a more restricted sense the present invention comprises taking a titanium oxide pigment and treating it with between about 0.5% to about 10% of a metal salt of a water soluble organic acid especially organic salts of aluminum and the metals of the second group of the periodic arrangement of the elements such as beryllium, magnesium, calcium, zinc, strontium, and barium. The treatment of the titanium oxide pigment with the agent may be carried out by simple dry blending of the dry pigment and agent or by incorporation of the agent with the pigment in a water paste or by adsorption of the agent from a water solution.

In connection with treatment processes involving adsorption of the salt by the pigment, there are a number of variations which can be employed in carrying out the treatment. The amount of salt retained by the pigment can be regulated by controlling the concentration of the solution used, the filtrate from the treatment can be recycled, additional salt added and used again. The amount of adsorption can be changed by one skilled in the art by varying such factors as temperature, acidity, or alkalinity of the system or by varying the composition of the medium from which the treating material is adsorbed.

As an illustration of one type of modification a treatment with aluminum acetate may serve as an example. This salt is subject to hydrolysis, is quite unstable in solution and excess acid is often required to keep it in solution. Aluminum acetate may be formed in situ in a titanium dioxide slurry by adding aluminum sulfate followed by barium acetate forming aluminum acetate and insoluble barium salt. Aluminum acetate can then be readily hydrolyzed by heating the solution thereby depositing relatively insoluble basic aluminum acetate on the pigment particle surfaces.

The treated titanium oxide pigment obtained according to any of the above described processes is then ready for incorporation into coating compositions after having been dried and this incorporation may be accomplished by any of the known conventional methods.

The preferred embodiment of the present invention comprises treating a titanium oxide pigment with between about 1% to about 5% of a salt of a relatively volatile acid. The preferred agents are magnesium, calcium, barium, strontium, aluminum, beryllium, zinc and cadmium acetates and basic acetates. The treatment of the pigment with the salt is carried out by any process as described above. Of these processes, the incorporation of the agent with the pigment in water paste is preferred. According to this process the titanium oxide pigment is mixed with a salt from the class mentioned and sufficient water added to give a suitable paste. The paste is then thoroughly mixed to break up pigment aggregates and to give uniform distribution of the salt with the pigment. The paste is dried and the pigment pulverized after which it is ready for use. The titanium oxide pigment, the particles of which are coated with a compound as stated above, is then ready for use in the making of coating compositions by any known conventional method.

It is understood that the use of salts of formic acid, propionic, butyric acid, citric acid, oxalic acid, etc., is within the scope of this invention. Organic salts of lead may be employed in the herein described invention although the results obtained by their use are inferior to the results obtained when the aforementioned preferred agents are employed.

The term "relatively volatile acid" as used herein means that the acid has an appreciable vapor pressure at temperatures encountered by the exposed paint. For example, summer temperatures on surfaces directly exposed to the sun are probably often as high as 120° to 130° F.

The term "titanium oxide pigment" as used herein includes titanium dioxide, metal titanates and titanium dioxide extended with barium sulfate, calcium sulfate, silica, silicates, etc.

The term "associated" as used herein designating the relation of titanium pigment and agent includes simple blending of dry pigment and agent, incorporation of agent with pigment in a water paste, and adsorption of agent from water solution.

It is understood that the salts may be used alone or in combination in carrying out the herein described invention.

The following examples illustrates methods for preparing these improved pigments covered in this invention as well as their use in coating compositions. These examples are given solely for the purpose of illustration and they are not intended to impose limitations of any kind on the herein described invention.

*Example I*

4000 grams of titanium oxide was mixed with 3500 cc. of dilute zinc acetate solution containing 183 grams of zinc acetate. The paste was then thoroughly mixed to break up pigment aggregates and to give a uniform distribution of zinc salt with the pigment. The paste may be mixed in any suitable mixing device and the amount of water adjusted to give a workable paste. The paste was then dried and the pigment pulverized after which it was ready for use.

The pigment as described in this example was used in the formulation of a baking enamel based on a drying oil modified polyhydric alcohol-polybasic acid resin and the enamel was found to possess superior resistance to yellowing when exposed to light. Indoor exposures indicate a very marked superiority in color retention of the enamel containing the treated pigment over a similar enamel pigmented with an untreated titanium oxide pigment.

*Example II*

Similar results were also obtained using a pigment treated with barium acetate (7% barium acetate on the basis of the titanium oxide). The treatment was carried out in the same manner as described for zinc acetate in Example I.

*Example III*

Marked improvement in color stability was also obtained using a pigment treated with barium citrate. The barium citrate treated pigment was prepared as follows:

500 grams of titanium dioxide was slurried in 900 grams of water to which was added 500 grams of water containing 5 grams of citric acid. The slurry was then thoroughly stirred to uniformily incorporate the citric acid with the pigment. A solution of barium hydroxide was then slowly added to the well agitated slurry until the slurry had a pH value of 7.0–7.2. The slurry was then filtered and the pigment dried after which it was used in the formulation of an enamel of the same type as described above for the zinc acetate treated pigment.

*Example IV*

500 parts of titanium oxide was stirred into 1000 parts of a 0.1 molar barium acetate solution. The slurry was thoroughly agitated to insure uniform distribution of the agent and the pigment. The slurry may also be ground in a pebble mill or passed through a colloid mill to break up pigment aggregates. The slurry was then filtered, the pigment dried and then pulverized, after which it was ready for use.

The experiments indicate that the titanium oxide adsorbed approximately 0.75% of barium acetate from the solution of the concentration used in the above example. Somewhat more barium acetate than this is however retained by the pigment due to the fact that the filter cake is not dry and some barium acetate solution is retained. Because of the adsorption of barium acetate the titanium dioxide particles are actually coated with a layer of salt and the agent is thereby very effectively distributed on the pigment.

Pigments similar to those described in the above examples were ground in linseed oil and exposed outdoors during the summer months under the severe weathering conditions of summer exposure. Such single pigment paints are probably not practical products but served to show differences between the untreated and treated pigments. The paints containing the treated pigments showed much greater resistance to chalking than those pigments with the untreated controls.

Example V

Pigment combination and coating composition:

Pigment (dry blend): Parts
- TiO₂ ............................. 535
- Calcium oxalate ................. 290

Vehicle:
- Linseed oil ..................... 478
- Drier paste ..................... 27
- Thinner (volatile) .............. 61

This example illustrates the use of a relatively insoluble salt derived from a water-soluble acid. This salt was much less effective than calcium acetate but imparted a definite improvement in chalking resistance.

Example VI

This example illustrates use of dry blended pigment in coating composition preparation.

Pigment: Parts
- TiO₂—BaSO₄ ..................... 896
- Barium acetate .................. 135

Vehicle:
- Linseed oil ..................... 439
- Bodied linseed oil .............. 40
- Drier paste ..................... 27
- Thinner ......................... 193

In preparing dry blended pigments it is important that the antichalking agent be as finely divided as possible so that it can be thoroughly and uniformly incorporated with the pigment and thereby be present in the most effective form.

Example VII

Illustrates use of dry blended pigment in coating composition in which the "anti-chalking" agent is used to augment the effect of zinc oxide.

Pigment and filler constituents: Parts
- TiO₂ ............................ 134
- Barium acetate .................. 81
- Blanc fixe ...................... 321
- Zinc oxide ...................... 267
- Magnesium silicate .............. 89

Vehicle:
- Linseed oil ..................... 439
- Bodied linseed oil .............. 40
- Drier paste ..................... 27
- Thinner (volatile) .............. 288

This coating composition when exposed showed greater chalking resistance than a similar coating composition which did not contain barium acetate with the titanium pigment. This paint finally failed by checking and cracking as did the untreated control. It is interesting to note that the added barium acetate increased the chalking resistance but did not accelerate the checking and cracking, whereas certain basic materials had a tendency to increase this type of failure.

The other agents included in the scope of this case can be used in the same manner as indicated for the specific agents given in the above examples.

Having disclosed the herein described invention, the following is claimed as new and useful.

1. A titanium oxide pigment which comprises titanium dioxide and between about 0.5% to about 35% of a salt of a water soluble aliphatic acid, and a metal selected from the class consisting of magnesium, calcium, barium, strontium, aluminum, beryllium, zinc, and cadmium.

2. A titanium oxide pigment which comprises titanium dioxide and between about 0.5% to about 10% of a salt of a water soluble aliphatic acid, and a metal selected from the class consisting of magnesium, calcium, barium, strontium, aluminum, beryllium, zinc, and cadmium.

3. A titanium oxide pigment which comprises titanium dioxide and between about 0.5% to about 10% of a salt of an aliphatic acid, said salt being selected from the class consisting of magnesium, calcium, barium, strontium, aluminum, beryllium, zinc, and cadmium acetates and basic acetates.

4. A titanium oxide pigment which comprises titanium dioxide and between about 0.5% to about 10% of a salt of a water soluble aliphatic acid, and aluminum.

5. A titanium oxide pigment which comprises titanium dioxide and between about 1% to about 5% of aluminum acetate.

6. A titanium oxide pigment which comprises titanium dioxide and between about 0.5% to about 10% of a basic salt of a water-soluble aliphatic acid and aluminum.

7. A process for producing an improved pigment which comprises adding aluminum sulfate to a titanium dioxide slurry, subsequently adding barium acetate and thereafter heating the resulting solution, thereby depositing on the surface of the pigment particles insoluble basic aluminum acetate.

8. In a process for producing an improved pigment the step which comprises mixing a titanium dioxide pigment with a salt of an aliphatic acid, said salt being selected from the class consisting of magnesium, calcium, barium, strontium, aluminum, beryllium, zinc, and cadmium acetates and basic acetates.

9. In a process for producing an improved pigment the step which comprises mixing a solution comprising titanium dioxide and between about 0.5% to about 10% of a salt of an aliphatic acid, said salt being selected from the class consisting of magnesium, calcium, barium, strontium, aluminum, beryllium, zinc, and cadmium acetates and basic acetates.

10. A process for producing an improved pigment which comprises mixing titanium dioxide with between about 0.5% to about 10% of a salt of an aliphatic acid, said salt being selected from the class consisting of magnesium, calcium, barium, strontium, aluminum, beryllium, zinc, and cadmium acetates and basic acetates, adding water thereto to give a paste, mixing the paste in order to break up the pigment aggregates and to give uniform distribution of the salt with the pigment, drying the paste, and thereafter pulverizing the resulting pigment.

11. A process for producing an improved pigment which comprises mixing titanium dioxide with aluminum acetate, adding water thereto to give a paste, mixing the paste in order to break up the pigment aggregates and to give uniform distribution of the salt with the pigment, drying the paste, and thereafter pulverizing the resulting pigment.

12. A process for producing an improved pigment which comprises mixing titanium dioxide with barium acetate, adding water thereto to give a paste, mixing the paste in order to break up the pigment aggregates and to give uniform distribution of the salt with the pigment, drying the paste, and thereafter pulverizing the resulting pigment.

13. A process for producing an improved pigment which comprises mixing titanium dioxide with zinc acetate, adding water thereto to give a paste, mixing the paste in order to break up the pigment aggregates and to give uniform distribution of the salt with the pigment, drying the paste, and thereafter pulverizing the resulting pigment.

14. A titanium oxide pigment which comprises titanium dioxide and between about 1% to about 5% of barium acetate.

15. A titanium oxide pigment which comprises titanium dioxide and between about 1% to about 5% of zinc acetate.

GORDON DERBY PATTERSON.